Patented July 21, 1953

2,646,372

UNITED STATES PATENT OFFICE 2,646,372

IMPREGNATING CELLULOSE FIBERS AND COMPOSITION THEREFOR

Thomas C. Whitner, Elizabeth, N. J.

No Drawing. Application May 16, 1947, Serial No. 748,674

14 Claims. (Cl. 117—143)

This invention relates to impregnation of cellulose fibers and particularly to the impregnation of cellulose textile fibers with sericeous material.

In U. S. Patent 2,417,388, I have described a method whereby impregnation of such textile fibers with sericeous material can be accomplished with the aid of an aqueous solution containing both an alkylolamine-copper complex and a small proportion of an alkali metal hydroxide. Silk fibers are dissolved in such a solution, cellulose fibers then are impregnated with the solution of silk, and afterwards the impregnated fibers are washed with an aqueous solution of an acidic agent forming water-soluble salts with the copper complex and the alkali metal hydroxide and lastly with water to remove the water-soluble salts. Such aqueous solutions of an alkali metal hydroxide and an alkylolamine-copper complex are solvents for silk but apparently exert very little if any solvent effect on cellulose.

I have observed that tetra-alkylol ammonium hydroxides, such as tetra-ethanol, tetra-propanol and tetra-butanol ammonium hydroxides, can be substituted for alkylolamines in the preparation of aqueous solutions which are solvents for silk. Such alkylol substituted ammonium hydroxides form water-soluble complexes with copper salts. And in addition, I have noted when both the free or uncombined tetra-alkylol ammonium hydroxide and a copper complex thereof are present simultaneously in an aqueous solution the latter becomes a solvent for silk fibers. In this respect the tetra-substituted ammonium hydroxides differ from alkylol substituted ammonia (or alkylolamines). That is, an aqueous solution of free or uncombined alkylolamine and a copper complex thereof does not seem to be a solvent for silk fibers. However, I have observed also that the rate of solution as well as the quantity of silk in an aqueous solution of a tetra-alkylol ammonium hydroxide and copper complex thereof can be substantially increased by the addition or dissolution of a small proportion of an alkali metal hydroxide, such as sodium or potassium hydroxide.

Solutions suitable for impregnating cellulose fibers with sericeous material according to this invention can be prepared in any convenient manner. For example, a water-soluble copper salt, such as copper chloride, sulfate or acetate, is dissolved in the aqueous medium and an aqueous solution of the tetra-alkylol ammonium hydroxide added thereto slowly. At first, insoluble copper hydroxide (or hydrated copper oxide) is formed but as more of the tetra-alkylol ammonium hydroxide is added slowly this insoluble copper compound dissolves giving rise to a blue colored aqueous solution. The depth of color of the latter will depend, of course, on the proportion and quantity of copper salt initially employed. After the colored solution of tetra-alkylol ammonium hydroxide-copper complex is obtained, an excess of the tetra-alkylol ammonium hydroxide is admixed and dissolved therein. Or, instead of adding the alkylol ammonium hydroxide there can be dissolved a small proportion of an alkali metal hydroxide in the solution of copper complex. If desired, an excess of the tetra-alkylol ammonium hydroxide can be employed simultaneously with the alkali metal hydroxide.

Another procedure for preparing solutions suitable for my purpose comprises dissolving the copper salt in water, adding an alkali (e. g., sodium or potassium hydroxide) to this solution to precipitate copper hydroxide, washing the latter with water until it is substantially free of alkali and salts, admixing the washed copper hydroxide with water, and admixing a solution of the tetra-alkylol ammonium hydroxide with the water and copper hydroxide until the latter dissolves with the simultaneous formation of a blue aqueous solution. As mentioned above, either an excess of the tetra-alkylol ammonium hydroxide or a small proportion of alkali metal hydroxide, or both, may be dissolved in the aqueous solution of copper complex.

After the aqueous solution of copper complex has been prepared by any one of the above-indicated procedures, or by an equivalent procedure, silk fibers are admixed therewith and the mixture stirred until the fibers dissolve or until the solution becomes saturated with the fibers. Preferably, this dissolution of silk is effected at room or atmospheric temperature. The actual quantity of silk which can be dissolved in a solution of the copper complex appears to depend upon the concentrations and proportions of alkali metal hydroxide, tetra-alkylol ammonium hydroxide and copper complex. By varying these three factors it is possible to secure silk solutions whose concentrations cover a wide range.

The silk fibers used for impregnating cellulose according to my invention preferably are subjected to a degumming operation prior to their employment. If desired, they may be bleached also before being dissolved in the aqueous solution of copper complex. Silk fibers which are not weighted (i. e., impregnated with oxides or salts of metals) are particularly suitable. However, I do not wish to preclude employment of weighted fibers.

Impregnation of cellulose fibers with the aqueous solution containing dissolved silk can be effected in any convenient or appropriate manner. For example, the cellulose fibers may be immersed in the solution of silk until they are saturated with it. Or, the solution of silk may be sprayed onto the cellulose fibers. The exact manner in which impregnation is accomplished is not so important. The important point is to obtain complete and thorough saturation of the cellulose fibers with the solution of silk.

After the fibers are impregnated, they are washed with an aqueous solution of an acidic substance. The latter may be an acid, such as hydrochloric, hydrobromic, sulfuric or acetic acid, or may be an acidic salt, such as sodium or potassium bisulfate. The acidic agent employed in this step should form water-soluble salts with the tetra-alkylol ammonium hydroxide, with the alkali metal hydroxide and with copper. The concentration of the aqueous solution of acidic agent should be great enough to effect substantially complete removal of all copper compounds from the cellulose fibers as well as that of all alkaline substances employed, but not sufficiently great to effect any harmful or deleterious action on the textile material undergoing treatment.

After the acid wash, the cellulose fibers are washed or rinsed well with water to obtain substantially complete removal of water-soluble salts as well as of acidic agent retained by the fibers. Next, the latter can be dried in any convenient manner.

The following examples will illustrate my invention.

*Example 1.*—Copper chloride ($CuCl_2 \cdot 2H_2O$) was dissolved in water, and to the solution was added slowly a 40 per cent aqueous solution of tetra-ethanol ammonium hydroxide until the precipitate copper hydroxide (which formed on initially adding the hydroxide) had dissolved and there was obtained a greenish blue aqueous solution. Then there was admixed with the blue liquid a quantity of tetra-ethanol ammonium hydroxide equal to one-half of that employed in making the blue colored solution. Afterwards, the latter was diluted with water until its concentration of copper was equivalent to 5 g. of the copper salt per 100 cc. In this solution of copper complex and uncombined tetra-ethanolammonium hydroxide was dissolved sufficient silk fibers to furnish a liquid containing 1.5 per cent of dissolved silk.

A sample of bleached cotton cloth was covered with some of the silk solution and worked therein for 30 minutes at room temperature. Next, the impregnated cloth was washed with a dilute aqueous solution of hydrochloric acid and afterwards rinsed well with cold water to remove substantially all acidic material and salts from the fibers. The treated cloth then was air-dried. It had a softer and smoother feel than the original bleached cotton fabric.

The treated sample of cloth as well as one of the untreated fabric were dyed separately in the following manner: A dye bath was prepared using 100 parts by weight of water to 1 part of cloth and a quantity of a red substantive dye equal to 10 per cent of the weight of cloth. The baths were heated to 70° C., the samples of textile goods placed therein, and the baths maintained at a temperature of 70° to 75° C. for 1 hour. Afterwards, the baths were allowed to cool to room temperature, the fabrics then removed, rinsed well with cold water, and air-dried.

The treated cloth still retained its softer and smoother feel and also it dyed to a darker red color than the untreated sample.

*Example 2.*—An aqueous solution containing both tetra-ethanol ammonium hydroxide-copper complex and tetra-ethanol ammonium hydroxide was prepared as indicated in Example 1 with the modification that after dilution with water the concentration of copper in solution was equivalent to 2.5 g. of the copper salt per 100 cc. Sufficient silk fibers were dissolved therein to give substantially a 1.5 per cent solution of silk.

A sample of bleached cotton cloth was impregnated with this silk solution in the manner indicated in Example 1. Afterwards, the impregnated cellulose fibers were washed with dilute aqueous hydrochloric acid, then rinsed well with cold water and dried. This sample had a softer and smoother feel than the original untreated fabric.

The above treated sample and also one of the original fabric were dyed in the manner indicated in Example 1. The treated cloth after dyeing retained its softer and smoother feel and was darker in color than the other dyed material.

*Example 3.*—Crystalline copper chloride was dissolved in water and to the aqueous solution was added slowly a 40 per cent aqueous solution of tetra-ethanol ammonium hydroxide until a clear greenish blue aqueous solution of the copper complex was obtained. This colored liquid then was diluted with water until its concentration of dissolved copper was equivalent to 1.5 g. of the copper salt per 100 cc. Next, solid sodium hydroxide was dissolved in this aqueous solution of copper complex in sufficient quantity to react with the tetra-ethanol ammonium salt (formed by interaction of the substituted ammonium hydroxide with the copper salt) and to give substantially 1 per cent of free or uncombined alkali metal hydroxide. During the dissolution of the latter, the aqueous solution of copper complex was kept substantially at room temperature. Sufficient silk fibers then were dissolved in the solution to furnish substantially a 2 per cent solution of silk.

A portion of unbleached cotton cloth was covered with some of the liquid containing dissolved silk and worked therein for 40 minutes at room temperature. Afterwards, the impregnated cloth was washed with dilute aqueous sulfuric acid, then rinsed well with cold water and dried. The treated fabric, as compared with the original unbleached cloth, had a smoother and softer feel.

This treated sample of cloth and also one of the untreated cloth were dyed as indicated in Example 1, with the exception that a blue substantive dye was used. In this instance, the treated fabric dyed to a somewhat darker color than the untreated cloth.

*Example 4.*—Crystalline copper sulfate ($CuSO_4 \cdot 5H_2O$) and a quantity of ammonium chloride equal to one-third the weight of the copper salt were dissolved in water. To this aqueous solution was added the requisite quantity of aqueous sodium hydroxide to precipitate all of the copper as cupric hydroxide. The latter was washed with water by decantation and then filtered and again washed with water until it was substantially free of all salts and alkali. The washed copper hydroxide was mixed with some water and 40 per cent aqueous tetra-ethanol ammonium hydroxide was added slowly to the mixture until all of the copper hydroxide dissolved with the formation of a clear greenish blue solution of the copper complex. Next, a quantity of tetra-ethanol ammonium hydroxide equal to three-fourths that required for dissolution of the copper hydroxide was added to the aqueous solution of copper complex. The latter solution then was diluted with water until its copper concentration was equivalent to 3.43 g. of copper sulfate per 100 cc. This solution of copper complex and excess tetra-ethanol ammonium hydroxide was saturated with silk fibers by adding silk thereto in small portions until dissolution no longer seemed to take place.

Unbleached cotton yarn was covered with some of this silk solution and worked therein for 30 minutes at room temperature. Afterwards, the impregnated yarn was washed with dilute aqueous sulfuric acid, then rinsed well with water and dried. This treated cotton material had a softer and smoother feel than the untreated yarn.

*Example 5.*—The solution of copper complex as prepared in Example 4 was employed in this instance with this modification: Before saturating the liquid with silk fibers there was dissolved therein sufficient solid potassium hydroxide to furnish substantially 2 per cent of the alkali metal hydroxide in solution. Dissolution of potassium hydroxide was effected while the liquid was maintained at substantially room temperature.

This solution was saturated with silk and then bleached cotton yarn was immersed in some of the liquid for 20 minutes at room temperature. Afterwards, the yarn was washed with dilute aqueous sulfuric acid, rinsed well with water, and dried. It possessed a very smooth silky feel as compared with the untreated yarn.

*Example 6.*—Copper hydroxide was prepared, washed by decantation, filtered, washed, and dissolved in aqueous tetra-ethanol ammonium hydroxide as indicated in Example 5. Afterwards, an excess of the substituted ammonium hydroxide equal to one-third of that needed for formation of the copper complex was added to the aqueous solution. The latter then was diluted with water until its concentration of copper was substantially that of the solution of Example 5. This solution was saturated with dissolved silk fibers.

Unbleached cotton cloth was immersed in some of this silk solution at room temperature for 90 minutes. Next, the impregnated cloth was washed successively with dilute aqueous sulfuric acid and water and dried. This treated sample was subjected to another impregnation with silk, using a second portion of the silk solution, and again washed successively with dilute aqueous sulfuric acid and water and afterwards dried. This fabric had a smoother and fuller feel than the original untreated cotton goods.

This treated sample and one of the untreated fabric were dyed separately in the following manner: Each sample was placed in a bath consisting of 100 parts of water per 1 part of cloth and in which was dissolved a quantity of red substantive dye equal to 10 per cent of the weight of cloth. The fabrics were allowed to remain in the respective baths for 90 minutes at room temperature. Afterwards, each sample was removed from the bath, rinsed well with cold water and then air-dried.

The untreated fabric was stained to a light pink color. The treated cloth was dyed to a darker color which was a deep pink or a light red.

From the foregoing disclosures it will be seen that my invention involves preparing a solution of silk fibers by dissolving the latter in an aqueous solution containing a tetra-alkylol ammonium hydroxide-copper complex and free or uncombined tetra-alkylol ammonium hydroxide. This aqueous solution may contain also a small proportion, say 0.5 to 4 per cent of the weight of the solution, of an alkali metal hydroxide. My invention also includes impregnating cellulose fibers, such as cotton or linen, with the silk solution and afterwards washing the impregnated fibers with an aqueous solution of an acidic agent which will convert the copper compounds as well as the tetra-alkylol ammonium hydroxide and the alkali metal hydroxide into water-soluble salts. Although a large proportion of these salts will be removed from the fibers during the acid wash, nevertheless I rinse or wash well the fibers afterwards with water so that substantially all water-soluble salts and all of the acidic agent are eliminated from the cellulose fibers.

As just mentioned, I prefer to use a small proportion of an alkali metal hydroxide in preparing the solutions of silk. In the case of the tetra-alkylol ammonium hydroxide, however, any desired proportion of this substance may be employed or present in the solutions. My experiments have indicated that silk fibers are insoluble, or substantially so, in aqueous solutions of these substituted ammonium hydroxides, but are soluble in aqueous solutions containing a tetra-alkylol ammonium hydroxide and a copper complex thereof.

As pointed out previously, the acidic agent employed in the acid wash should be one that will furnish water-soluble interaction products with the tetra-alkylol ammonium hydroxide, alkali metal hydroxide and copper complex. The strength of this solution may be varied over a wide range and concentrations of 5, 10, 15 or even 20 per cent may be employed. The exact concentration and also the quantity of solution will be governed largely by such factors as the amount of fibers being washed and the proportion of substances (e. g., alkali metal hydroxide and copper complex) impregnated in the fibers. It is important, however, that the quantity and concentration of the acidic solution be great enough so that during the washing operation the liquid will not become locally neutral or alkaline.

Cellulose fibers such as cotton or linen are suitable for my purpose and these fibers should be substantially free of extraneous materials such as size, resin, gums and the like before being impregnated with the silk solution. It will be understood that in the above examples illustrating my invention that all cellulose material was given an appropriate treatment, such as an alkali boil, prior to impregnation. However, the fibers prior to impregnation may be unbleached, bleached, bleached and mercerized, or unbleached and mercerized. Also, the fibers may be treated with the silk solutions when in the form of loose fibers, yarns or woven fabrics.

What I claim is:

1. The process for treating cellulose fibers which comprises impregnating said fibers with an aqueous solution of a tetra-alkylol ammonium hydroxide-copper complex and a tetra-alkylol ammonium hydroxide and in which solution are dissolved silk fibers, washing said impregnated fibers with an aqueous solution of an acidic agent yielding water-soluble salts with said copper complex and with said tetra-alkylol ammonium hydroxide, and removing substantially all of said water-soluble salts from said cellulose fibers.

2. The process for treating cellulose fibers which comprises impregnating said fibers with an aqueous solution of a tetra-ethanol ammonium hydroxide-copper complex and tetra-ethanol ammonium hydroxide and in which solution are dissolved silk fibers, washing said impregnated fibers with an aqueous solution of an acidic agent yielding water-soluble salts with said copper-complex and with tetra-ethanol ammonium hydroxide, and removing substantially all of said water-soluble salts from said cellulose fibers.

3. The process for treating cellulose fibers which comprises impregnating said fibers with an aqueous solution of a tetra-alkylol ammonium hydroxide-copper complex, a tetra-alkylol ammonium hydroxide and an alkali metal hydroxide and in which solution are dissolved silk fibers, the proportion of said alkali metal hydroxide being not less than about 0.5 per cent and not more than about 4 per cent of the weight of said aqueous solution, washing said impregnated fibers with an aqueous solution of an acidic agent yielding water-soluble salts with said copper-complex, said tetra-alkylol ammonium hydroxide and said alkali metal hydroxide, and removing substantially all of said water-soluble salts from said cellulose fibers.

4. The process for treating cellulose fibers which comprises impregnating said fibers with an aqueous solution of a tetra-ethanol ammonium hydroxide-copper complex, tetra-ethanol ammonium hydroxide and an alkali metal hydroxide and in which solution are dissolved silk fibers, the proportion of said alkali metal hydroxide being not less than about 0.5 per cent and not more than about 4 per cent of the weight of said aqueous solution, washing said impregnated fibers with an aqueous solution of an acidic agent yielding water-soluble salts with said copper complex, with said alkali metal hydroxide and tetra-ethanol ammonium hydroxide, and removing substantially all of said water-soluble salts from said fibers.

5. The process according to claim 4 in which the alkali metal hydroxide is sodium hydroxide.

6. The process according to claim 4 in which the alkali metal hydroxide is potassium hydroxide.

7. A bath for impregnating cellulose fibers which comprises an aqueous solution of a tetra-alkylol ammonium hydroxide-copper complex and a tetra-alkylol ammonium hydroxide and silk fibers dissolved therein.

8. A bath for impregnating cellulose fibers which comprises an aqueous solution of a tetra-ethanol ammonium hydroxide-copper complex and tetra-ethanol ammonium hydroxide and silk fibers dissolved therein.

9. A bath for impregnating cellulose fibers which comprises an aqueous solution of a tetra-alkylol ammonium hydroxide-copper complex, a tetra-alkylol ammonium hydroxide and an alkali metal hydroxide, and silk fibers dissolved therein, the proportion of said alkali metal hydroxide being not less than about 0.5 per cent and not more than about 4 per cent of the weight of said aqueous solution.

10. A bath for impregnating cellulose fibers which comprises an aqueous solution of a tetra-ethanol ammonium hydroxide-copper complex, tetra-ethanol ammonium hydroxide and an alkali metal hydroxide, and silk fibers dissolved therein, the proportion of said alkali metal hydroxide being not less than about 0.5 per cent and not more than about 4 per cent of the weight of said aqueous solution.

11. A bath for impregnating cellulose fibers according to claim 10 in which the alkali metal hydroxide is sodium hydroxide.

12. A bath for impregnating cellulose fibers according to claim 10 in which the alkali metal hydroxide is potassium hydroxide.

13. The method of claim 1 in which the amount of tetra-alkylolammonium hydroxide is from $33\frac{1}{3}\%$ to $75\%$ in excess of that required to form the complex, the concentration of dissolved copper is equivalent to 1.5 g. to 5 g. copper chloride per 100 cc. of solution, and the concentration of silk in the solution is from $1.5\%$ to saturated.

14. The bath of claim 7 in which the amount of tetra-alkylolammonium hydroxide is from $33\frac{1}{3}\%$ to $75\%$ in excess of that required to form the complex, the concentration of dissolved copper is equivalent to 1.5 g. to 5 g. copper chloride per 100 cc. of solution, and the concentration of silk in the solution is from $1.5\%$ to saturated.

THOMAS C. WHITNER.

References Cited in the file of this patent

UNITED STATES PATENTS

| Number | Name | Date |
|---|---|---|
| 2,417,388 | Whitner | Mar. 11, 1947 |
| 2,565,832 | Whitner | Aug. 28, 1951 |

OTHER REFERENCES

Handbook of Chemistry and Physics, 29th ed., page 1384, publ. by the Chemical Rubber Publ. Co.

Synthetic Organic Chemicals, Carbide and Carbon-Chemicals Corp. 11th. ed. June 1, 1942, page 61.